S. Merrick,
Wrench.
No 207. Reissued Nov. 25, 1851.
9030X Related Doc
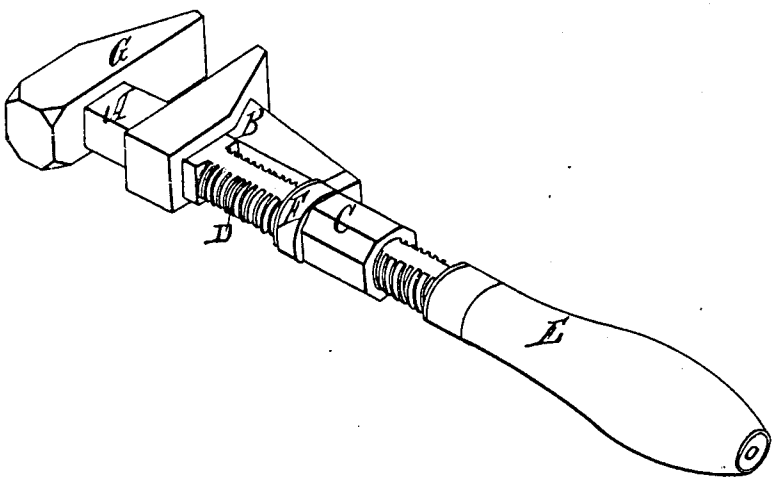
N. PETERS, PHOTO-LITHOGRAPHER, WASHINGTON, D. C.

UNITED STATES PATENT OFFICE.

SOLYMAN MERRICK, OF SPRINGFIELD, MASSACHUSETTS.

IMPROVEMENT IN SCREW-WRENCHES.

9030X RELATED DOC

Specification forming part of Letters Patent dated August 17, 1835; Reissue No. 207, dated May 17, 1842; extended May 14, 1849.

*To all whom it may concern:*

Be it known that I, SOLYMAN MERRICK, of Springfield, in the county of Hampden and State of Massachusetts, have invented an Improvement in the Screw-Wrench; and I do hereby declare that the following is a full and exact description.

The nature of my invention consists in combining with a wrench in which the inner jaw slides on a bar permanently attached to the outer jaw and constituting the handle or permanently attached thereto, a screw-thread and nut, or the equivalent thereof, connecting the movable jaw with the said bar between the said movable jaw and that part of the said permanent handle which is grasped by the operator, so that the movable jaw can be accurately adjusted by the same hand that grasps the handle.

My invention also consists in making the screw upon two circular edges of the flat bar of the wrench for the purpose of allowing greater strength to the main bar in the direction in which it is most needed, and thereby avoid the necessity of making the bar, and consequently the jaws of the wrench, thicker and heavier than a due proportion of strength requires with reference to the uses for which the wrench is intended, and also to give the dirt or rust, which may collect within the nut, an opportunity to escape through the apertures between the threads of the nut and the flat sides of the screw.

To enable others skilled in the art to make and use my improvement, I will proceed to describe its construction and operation.

I make the main bar of the wrench of iron, at one end of which I form a head, which constitutes the stationary jaw of the wrench. From this stationary jaw, and at right angles with it, I make the main bar of such proportions that its cross-section represents a parallelogram whose diameters are about as 5 to 7, the direction of the greater diameter corresponding with the jaws of the wrench. This part of the main bar I make a little longer than the slide-jaw is required to open, which jaw I make to fit this part of the main bar.

From the part of the main bar to which the slide-jaw is fitted I turn the edges of the bar to a diameter a little less than the greater diameter of the main bar, and of a length sufficient to receive the nut in addition to the distance required for the sliding jaw to open, and upon these circular edges of the bar I cut a single or double thread screw. I fit a nut to this screw, which nut I connect to the slide-jaw by means of a collar and groove at the end of the nut, which take into corresponding grooves at the end and underneath the slide-bar. The nut and slide-bar are held together by a strap, which passes around in the groove on the nut, and is riveted to the sides of the slide-bar in such a manner that the nut may turn easily around. The part of the nut which extends back from the groove toward the handle I make an octagon, and of sufficient length to be turned around by the hand. From the screw I make the main bar of suitable size and proportions, and of sufficient length to pass through the handle, which handle is driven on and held in its place by a screw and nut.

It will be seen by the foregoing arrangement that by turning the nut the slide-jaw will move in either direction, and may be set to any desired point on the bar.

I do not claim adapting one jaw to slide on a bar permanently attached to the other jaw and constituting a handle, or permanently attached to a handle, as this was known prior to my invention in wrenches having a pawl and rachet to fix the sliding jaw in any position required. Nor do I claim adjusting the sliding jaw relatively to the fixed jaw by means of a screw, this also having been known prior to my invention, with the screw-connection made between the two jaws and also between the handle and outer jaw, in such cases the connection between the bar and handle being weak and liable to derangement, and practically defective; but

What I claim as my invention, and desire to secure by Letters Patent, is—

1. Combining with a wrench in which the inner jaw slides on a bar permanently attached to the outer jaw, and making part of or permanently attached to the handle, substantially as described, a screw-thread and nut connecting the movable jaw with the said bar between the said movable-jaw and that part of the handle grasped by the operator in the manner and for the purpose substantially as described.

2. The arrangement of the screw upon the two circular edges of the flat bar in the manner and for the purpose herein described.

SOLYMAN MERRICK.

Witnesses:

HENRY VOSE,
WM. HOWLAND.